(12) United States Patent
Luthra

(10) Patent No.: US 9,341,412 B2
(45) Date of Patent: May 17, 2016

(54) METHODS AND SYSTEMS FOR REDUCING SILICA RECESSION IN SILICON-CONTAINING MATERIALS

(71) Applicant: GENERAL ELECTRIC COMPANY, Schenectady, NY (US)

(72) Inventor: Krishan Lal Luthra, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 727 days.

(21) Appl. No.: 13/717,773

(22) Filed: Dec. 18, 2012

(65) Prior Publication Data
US 2014/0165419 A1 Jun. 19, 2014

(51) Int. Cl.
*F01D 5/28* (2006.01)
*F02C 6/08* (2006.01)
*F02C 7/18* (2006.01)
*F26B 23/02* (2006.01)
*F23R 3/00* (2006.01)
*C04B 41/00* (2006.01)
*C04B 41/45* (2006.01)
*C04B 41/80* (2006.01)

(52) U.S. Cl.
CPC ............... *F26B 23/02* (2013.01); *C04B 41/009* (2013.01); *C04B 41/4519* (2013.01); *C04B 41/80* (2013.01); *F01D 5/28* (2013.01); *F02C 6/08* (2013.01); *F02C 7/18* (2013.01); *F23R 3/007* (2013.01); *F01D 5/288* (2013.01)

(58) Field of Classification Search
CPC ............... F02C 6/08; F02C 6/06; F02C 7/12; F02C 7/18; F02C 9/18; F23R 3/007; F01D 25/08; F01D 25/12; F01D 9/065; F01D 5/288; F01D 5/085; F01D 5/08; F01D 5/18; F01D 5/28; F01D 5/284; F05D 2260/20; F05D 2300/211; F05D 2300/222; F05D 2300/2261; F05D 2300/2283
See application file for complete search history.

(56) References Cited

U.S. PATENT DOCUMENTS

| | | | |
|---|---|---|---|
| 5,015,540 A | 5/1991 | Borom et al. | |
| 5,330,854 A | 7/1994 | Singh et al. | |
| 5,336,350 A | 8/1994 | Singh | |
| 5,962,103 A | 10/1999 | Luthra et al. | |
| 6,024,898 A | 2/2000 | Steibel et al. | |
| 6,183,197 B1* | 2/2001 | Bunker | F01D 5/141 415/178 |
| 6,347,446 B1 | 2/2002 | Luthra et al. | |
| 6,517,341 B1* | 2/2003 | Brun | C04B 41/009 110/343 |
| 7,595,114 B2 | 9/2009 | Meschter et al. | |
| 7,968,217 B2 | 6/2011 | Sarrafi-Nour et al. | |
| 2002/0076541 A1* | 6/2002 | Jarmon | C04B 35/806 428/312.6 |
| 2006/0213183 A1* | 9/2006 | Althaus | F01D 25/305 60/274 |
| 2006/0272331 A1* | 12/2006 | Bucker | C01B 3/386 60/774 |
| 2008/0083226 A1* | 4/2008 | Joshi | F02C 3/34 60/772 |
| 2008/0141645 A1* | 6/2008 | Evulet | F02C 3/22 60/39.12 |
| 2009/0155554 A1 | 6/2009 | Gentleman et al. | |

(Continued)

*Primary Examiner* — Andrew Nguyen
(74) *Attorney, Agent, or Firm* — John P. Darling

(57) ABSTRACT

The present disclosure relates to methods and systems for reducing silica recession of silicon-containing ceramics or silicon-containing ceramic composites, particularly those exposed to a combustion gas or to combustion gas environments, including those exposed to high temperature combustion gas environments. The methods and systems involve silicon-doping of compressed air and/or removal of moisture from compressed air prior to co-mingling the treated compressed air with the combustion gas to which the silicon-containing ceramics or silicon-containing ceramic composites are exposed.

18 Claims, 5 Drawing Sheets

(56) References Cited

U.S. PATENT DOCUMENTS

| | | | | |
|---|---|---|---|---|
| 2009/0246500 A1* | 10/2009 | Morra | ............ | C04B 35/565 428/304.4 |
| 2010/0024433 A1* | 2/2010 | Ackermann | ............ | F02C 3/22 60/783 |
| 2010/0279845 A1 | 11/2010 | Kebbede et al. | | |
| 2011/0097589 A1 | 4/2011 | Meschter et al. | | |

* cited by examiner

100

110

EXPOSING A SILICON-CONTAINING CERAMIC OR SILICON-CONTAINING CERAMIC COMPOSITE TO A HIGH TEMPERATURE COMBUSTION GAS ENVIRONMENT

120

CONTACTING A TARGET SURFACE OF THE SILICON-CONTAINING CERAMIC OR SILICON-CONTAINING CERAMIC COMPOSITE WITH A SILICON-DOPED GAS MIXTURE, THEREBY REDUCING SILICA RECESSION OF THE TARGET SURFACE

200

```
          ┌─────────────────────────────────────────────────────┐
          │                        210                          │
          │                                                     │
          │  EXPOSING A SILICON-CONTAINING CERAMIC OR SILICON-  │
          │  CONTAINING CERAMIC COMPOSITE TO A HIGH             │
          │  TEMPERATURE COMBUSTION GAS ENVIRONMENT             │
          └─────────────────────────────────────────────────────┘
                                    │
                                    ▼
          ┌─────────────────────────────────────────────────────┐
          │                        220                          │
          │                                                     │
          │  CONTACTING A TARGET SURFACE OF THE SILICON-        │
          │  CONTAINING CERAMIC OR SILICON-CONTAINING CERAMIC   │
          │  COMPOSITE WITH A DEHUMIDIFIED GAS MIXTURE,         │
          │  THEREBY REDUCING SILICA RECESSION OF THE TARGET    │
          │  SURFACE                                            │
          └─────────────────────────────────────────────────────┘
```

FIG. 2

METHODS AND SYSTEMS FOR REDUCING SILICA RECESSION IN SILICON-CONTAINING MATERIALS

The disclosure relates to methods and systems for use in reducing silica recession in silicon-containing ceramics or silicon-containing ceramic composites, particularly those exposed to a combustion gas environment, including those exposed to high temperature combustion gas environments such as encountered in industrial land-based turbines, aircraft engines, automobiles, and heat exchangers.

BACKGROUND

Silicon-based monolithic ceramics, such as silicon carbide, silicon nitride, and silicon-containing composites, including continuous-fiber reinforced ceramic composites, are attractive candidates for high temperature structural applications, such as component parts for gas turbines, aircraft engines, and heat exchangers. These silicon-containing materials are particularly appealing because of their excellent high temperature properties and lower density. For instance, in combustion gas environments, a performance benefit is obtained by replacing cooled metal components with uncooled or reduced cooling silicon-containing ceramic components. Material substitution of hot gas path components with such ceramics yields higher output power, improved thermal efficiency and reduced NOx emissions. Depending on the size of the component part and the mechanical specifications that the component must meet in service, silicon-containing composite ceramics including continuous or discontinuous-fiber reinforced ceramic composites, such as silicon carbide fiber reinforced silicon carbide or silicon-silicon carbide matrix composites, are sometimes selected over monolithic ceramics because of superior thermal and mechanical shock resistance, higher damage tolerance and strain-to-failure. Composites of this class, that is with a silicon carbide or a silicon-silicon carbide matrix, are commonly called silicon carbide/silicon carbide or SiC/SiC composites. Examples of discontinuous fiber reinforced composites include composites reinforced with silicon carbide whiskers. Examples of monolithic ceramics are silicon carbide, silicon nitride, and silicon-silicon carbide ceramics.

One advantage of silicon-containing ceramics or silicon-containing composites (herein, silicon-containing ceramics or composites) over metals is their superior high temperature durability which enable higher turbine rotor inlet temperatures. In addition, they exhibit low coefficient of thermal expansion and lower density in comparison to nickel-base superalloys. The relatively high thermal conductivity of silicon-containing composite systems is similar to nickel-based alloys at the use temperatures.

The gas turbine component parts where silicon-containing ceramics or silicon-containing composites are considered include the shroud and the combustion liner. The shroud forms the turbine outer flowpath and creates a sealing surface over the rotor buckets. It is a primary element in the turbine tip clearance and roundness system and is segmented in larger machines. It serves as a heat shield and insulates the turbine casing from the hot gas stream temperature. As part of the flow path, the shroud must have sufficient oxidation/corrosion resistance and be structurally sufficient to meet design life requirements for the engine temperature, pressure and flow environment.

The combustion liner contains the combustion reaction zone and conveys the hot gases to the turbine inlet. In low emissions combustors the flame temperature is minimized to limit production of thermal NOx. This is accomplished by putting most of the compressor air, except for turbine cooling air, through the premixers and minimizing the amount of cooling or dilution air through the liner. Complex thermal gradients and elevated temperatures in liners can lead to excessive distortion in metals causing loss of sealing, restrictions in cooling air flow, and increases in hot side heat transfer. Silicon-containing composites offer low cycle creep-fatigue resistance and very little deformation. As the case with the shroud, the combustion liner should have sufficient oxidation/corrosion resistance. Additional pieces of turbine components comprise nozzles, vanes, blades, buckets and transition pieces.

High oxidation resistance is imparted by formation of a protective silica ($SiO_2$) film on the silicon-containing ceramic or composite surface. The above proposed applications for the silicon-containing materials position them in direct contact with combustion gases, which are the product of the combustion of liquid fuels or natural gas hydrogen or coal. For natural gas, liquid or coal fuels, the products of combustion contain up to about twenty percent water vapor by volume dependent on the fuel-to-air ratio. Even higher water vapor levels are obtained for mixtures of natural gas and hydrogen or for pure hydrogen. In an environment containing water vapor and oxygen, thermodynamic calculations indicate the primary reactions which occur for the oxidation of silicon (present for example, as silicon carbide) are:

$$SiC + 3/2 O_2(g) = SiO_2 + CO(g) \quad (1)$$

$$SiC + 3H_2O(g) = SiO_2 + 3H_2(g) + CO(g) \quad (2)$$

Hydrogen and carbon monoxide react with oxygen in combustion gases to form water vapor and carbon dioxide. The silica film formed on the silicon-containing ceramic or composite in an oxygen/water vapor gas mixture may simultaneously volatilize by forming a silicon hydroxide or silicon oxyhydroxide species. For instance, some possible volatilization reactions are:

$$SiO_2 + H_2O(g) = SiO(OH)_2(g) \quad (3)$$

$$SiO_2 + 2H_2O(g) = Si(OH)_4(g) \quad (4)$$

$$2SiO_2 + 3H_2O(g) = Si_2O(OH)_6(g) \quad (5)$$

The volatilization of silica results in material loss resulting in reduction of the thickness of the silicon-containing ceramic or composite materials, or so-called surface recession. The observed rates of loss are of the order of a few mils to tens of mils per thousand hours of operation in the combustion gas environment. Depending on the fuel used, such fuel as natural gas, the reaction is favored by high water vapor content (up to about 20% by volume), high pressures (generally up to 30-40 ATM) and high temperatures (up to about 1200-1500° C.) found in many turbine, engine and heat exchanger applications. Thus, for long-term chemical durability of silicon-containing ceramics or composites in combustion environments the volatility of the silica film needs to be controlled during the lifetime of the component.

While environmental barrier coatings (EBCs) are helpful in protecting against surface silica recession, in some applications, EBCs may be needed for internal passages of components to protect against recession loss caused by compressed air used for cooling. However, to date, processing techniques are not available for EBCs of internal passages. Further, there is a need for alternate protection techniques if there is local spallation of the EBCs.

The present system and techniques are directed to overcoming these and other deficiencies in the art.

SUMMARY

The present techniques relate to methods and systems useful for reducing silica recession of silicon-containing ceramics or silicon-containing ceramic composites, particularly those exposed to a combustion gas, including a high temperature combustion gas.

According to one aspect, the present technique provides a method of reducing silica recession that involves the following steps: (i) exposing a silicon-containing ceramic or silicon-containing ceramic composite to a high temperature combustion gas environment; and (ii) contacting a target surface of the silicon-containing ceramic or silicon-containing ceramic composite with a silicon-doped gas mixture, thereby reducing silica recession of the target surface. According to this method, the silicon-doped gas mixture is produced by injecting silicon into compressed air at a location proximate the target surface to yield silicon-doped compressed air and co-mingling the silicon-doped compressed air with the combustion gas to yield the silicon-doped gas mixture. In one embodiment, this method further involves creating a laminar flow of the silicon-doped gas mixture over the target surface of the silicon-containing ceramic or silicon-containing ceramic composite. In another embodiment, the method further involves removing at least some moisture from the compressed air.

According to another aspect, the present technique provides a system for reducing silica recession, with the system including: (i) a combustor providing a high temperature combustion gas to at least one silicon-containing ceramic or silicon-containing ceramic composite; (ii) an air compressor providing compressed air for co-mingling with the combustion gas; and (iii) at least one silicon injector for injecting silicon into the compressed air to yield silicon-doped compressed air, where the at least one silicon injector is positioned so that injection of the silicon is performed immediately prior to co-mingling the combustion gas with the compressed air. In one embodiment, this system further includes at least one dehumidifying component for providing a moisture removal agent to the compressed air prior to co-mingling the dehumidified, silicon-doped compressed air with the combustion gas. In another embodiment, dehumidified compressed air is used for cooling a silicon-containing ceramic, a silicon-containing ceramic composite, or any other component in or proximate the system, and such dehumidification of the compressed air reduces the recession caused by compressed air without dehumidification.

According to another aspect, the present technique provides a method of reducing silica recession that involves the following steps: (i) exposing a silicon-containing ceramic or silicon-containing ceramic composite to a high temperature combustion gas environment; and (ii) contacting a target surface of the silicon-containing ceramic or silicon-containing ceramic composite with a dehumidified gas mixture, thereby reducing silica recession of the target surface, where the dehumidified gas mixture includes compressed air treated with a moisture removal agent effective to remove moisture from the compressed air. In one embodiment, this method further involves creating a laminar flow of the dehumidified gas mixture over the target surface of the silicon-containing ceramic or silicon-containing ceramic composite. In another embodiment, this method further involves injecting silicon into the compressed air at a location proximate the target surface, where the silicon is injected into the compressed air before, after, or both before and after dehumidifying the compressed air.

According to another aspect, the present technique provides a system for reducing silica recession, with the system including: (i) a combustor providing a high temperature combustion gas to a at least one silicon-containing ceramic or silicon-containing ceramic composite; (ii) an air compressor providing compressed air for co-mingling with the combustion gas; and (iii) a dehumidifying component providing a moisture removal agent to the compressed air prior to co-mingling dehumidified compressed air with the combustion gas. In one embodiment, this system further includes at least one silicon injector for injecting silicon into the compressed air to yield silicon-doped compressed air, where the at least one silicon injector is positioned so that injection of the silicon is performed immediately prior to co-mingling the combustion gas with the compressed air.

As provided herein, the methods and systems of the present technique are effective to reduce silica recession of silicon-containing ceramic or silicon-containing ceramic composites. In accordance with one embodiment, the methods and systems are effective in reducing silica recession by reducing the volatilization of the silica film of the silicon-containing ceramic or silicon-containing ceramic composites. As a result of reducing the volatilization of the silica film, the underlying silicon-containing ceramic or ceramic composite substantially maintains its operational thickness and does not suffer from attack and recession in the combustion environment. The methods and systems of the present technique are also useful when protective coatings are used on the components in combustion gas environments.

The present methods and systems are also useful in that they can be effective to eliminate the need for coating internal passages of hot stage components and provide protection to ceramic matrix composites (CMCs) in regions of EBC loss. Further, the present techniques can also be effective in extending the life of CMC components in the case of EBC spallation.

The present methods and systems are also useful for use with CMC applications that involve actively cooled components. The moisture content of compressed air on the ground can be as high as 3%, whereas at high altitudes where commercial airplanes fly the moisture content is very low. Therefore, aircraft engine components would typically not need an internal coating, whereas land-based gas turbines or aero-derivatives used on the ground would need an internal EBC coating for actively cooled components. This problem can be resolved by removing moisture from the compressed air.

In accordance with the present techniques, the need for internal EBC coating can also be eliminated or reduced by doping the compressed air used for cooling the components with organic silicon compounds with high enough vapor pressures that provide silicon levels in compressed air of the order of a few parts per million. This would eliminate or reduce the need for an EBC in the cooling channels. There is another advantage of the approach provided by the present system. As the compressed air comes out of the cooling holes, it will mix with combustion gases and flow on the surface of CMC components. There would be significant dilution of the silicon level by this mixing, but the silicon level locally on the surface of the CMC component may be high enough to eliminate the need of the EBC in some regions and extend the life of the EBC in other regions. The silicon level in compressed air is typically in the order of a part per million and the amount of compressed air used for cooling is of the order of a few percent of the total volume of the air flow thru the gas turbine.

Therefore, the doping of compressed air used for cooling with silicon will have a very small effect on the overall silicon level of the combustion gases, and the silicon level certainly will be well below current Environmental Protection Agency (EPA) exhaust limits.

The present methods and systems are also helpful to CMCs in case of EBC spallation, such as caused by foreign object damage (FOD). When spallation occurs, the CMC can recess to a point where a hole can form in the CMC. The present system can be effective to reduce the rate of recession, thereby increasing the time to form a hole. Secondly, when the hole forms, the recession rate would drop significantly because silicon-containing compressed air would leak from the hole reducing or eliminating the recession.

These and other objects, features, and advantages of the present methods, systems, and techniques will become apparent from the following detailed description of the various aspects of the present disclosure taken in conjunction with the accompanying drawings.

BRIEF DESCRIPTION OF THE DRAWINGS

FIG. 2 is a flowchart of one embodiment of a method of reducing silica recession according to the present disclosure. The embodiment shown in FIG. 2 involves providing a dehumidified gas mixture to a silicon-containing ceramic or a silicon-containing ceramic composite in order to reduce silica recession.

DETAILED DESCRIPTION

Figure 1:
FIG. 1. is a flowchart of one embodiment of a method of reducing silica recession according to the present disclosure. The embodiment shown in FIG. 1 involves providing a silicon-doped gas mixture to a silicon-containing ceramic or a silicon-containing ceramic composite in order to reduce silica recession.

In general, the present methods, systems, and techniques address problems associated with the loss of thickness (also referred to as "recession" or "material loss") of silicon-containing ceramics or silicon-containing ceramic composites (collectively referred to herein as "silicon-containing materials"), particularly loss of thickness due to their exposure to combustion gas and combustion gas environments, and particularly their exposure to high temperature combustion gas and high temperature combustion gas environments. Silicon-containing materials such as ceramic matrix composites (CMCs) (e.g., SiC/SiC composites) are used for making component parts of gas turbines (e.g., land-based gas turbines) and aircraft engines that are exposed to combustion gas environments. Gas turbines and aircraft engines use hydrocarbon fuels which, on combustion, produce water vapor containing gases. The water vapor reacts with the silicon-containing materials to form volatile silicon hydroxides, which reduce thickness of the silicon substrates, thereby causing surface recession.

The present techniques address these and other problems by providing methods and systems for use in reducing silica recession of silicon-containing ceramics or silicon-containing ceramic composites exposed to a combustion gas or combustion gas environments. In one embodiment of the present techniques, the silica recession of the silicon-containing ceramic or silicon-containing ceramic composite is reduced by a recession rate factor of at least about 2 compared to a silicon-containing ceramic or silicon-containing ceramic composite exposed to combustion gas without the use of the methods and systems of the present techniques, which methods and systems are described in more detail herein. In a particular embodiment, the silica recession is reduced by a recession rate factor of up to about 10. In other embodiments, the silica recession is reduced by a recession rate factor of up to about 20, up to about 40, up to about 60, up to about 80, or up to about 100.

As used herein, the term "combustion gas" refers to a gas associated with combustion and having a temperature of at least 500° C., and more particularly having a temperature that is above 1000° C. The term "combustion gas" also refers to a "high temperature combustion gas" as understood by those of ordinary skill in the relevant art.

As used herein, the term "combustion gas environment" refers to any environment that is exposed to a combustion gas, and in various embodiments refers to high temperature combustion gas environments such as those encountered in industrial land-based turbines, aircraft engines, automobiles, and heat exchangers. In a further example, the silicon-containing ceramics or silicon-containing ceramic composites are within an interior of the component and the compressed air is directed through the interior portion and in some cases exits via cooling holes in the component. The interior passages of the component typically have a coating, however further embodiments may exclude the coating. The techniques of the present disclosure reduce the silica recession and facilitate the elimination of the interior coating of the component. In various embodiments, such components are internally exposed to compressed air only and not to the combustion gases generated by the combustor. However, such components can have recession problems because of the presence of water vapor in compressed air.

As used herein, the term "material loss" refers to material loss of a silicon-containing material of a component (e.g., a component of a gas turbine or aircraft engine) that occurs through reaction of the silicon-containing material with a gas atmosphere (e.g., water vapor, combustion gases), particularly at high temperatures. In a fully dense material, the material loss results in reduction of the thickness of the component. If the material is porous, there will be material loss also taking place within the open porosity, in addition to thickness reduction similar to that of a dense material. In general, a porous material experiences higher material loss than a fully dense material. Porosity may cause additional material loss by oxidation of silicon-containing material.

The methods and systems of the present techniques are applicable to any silicon-containing material (e.g., any silicon-containing ceramic or any silicon-containing ceramic composite) that is exposed to combustion gas environments, including high temperature combustion gas environments. Components or parts used in aircraft or land-based turbine engines are non-limiting examples of silicon-containing materials that are exposed to combustion gas environments. In a particular embodiment, the silicon-containing ceramic or silicon-containing ceramic composite is a high temperature turbine component. Examples of components or parts used in turbine engines include, without limitation, combustion liners, vanes and blades, nozzles, buckets, transition pieces, shrouds, and the like. More particularly, the present techniques are applicable to target surfaces of the silicon-containing ceramic or silicon-containing ceramic composite. As provided herein, a "target surface" refers to any surface of a silicon-containing material, component, or part thereof that may become exposed to a combustion gas, including a high temperature combustion gas. The target surface includes the interior passages of the component that may be used for cooling.

In accordance with the present disclosure, examples of silicon-containing ceramics include, without limitation, silicon carbide, silicon carbide-silicon carbide composite, silicon nitride, silicon-silicon carbide, molybdenum silicide, and mixtures thereof.

In certain embodiments, the silicon-containing ceramic or silicon-containing ceramic component includes silicon as a "predominant component," which is generally meant to refer to silicon-based ceramics or ceramic composites where the largest percentage of the material composition by weight is silicon. In certain embodiments, carbon can be a predominant component of some silicon-containing ceramic composites, and may exceed silicon in certain cases. In those embodiments, silicon would be considered one predominant component, and carbon would be considered another predominant component. Likewise, the silicon-containing ceramic composite can be a continuous fiber reinforced ceramic composite, sometimes referred to as CFCC. Examples of silicon-containing ceramics are silicon carbide (SiC), silicon nitride ($Si_3N_4$), silicon-silicon carbide, and molybdenum disilicide. Examples of silicon-containing ceramic composites are silicon-silicon carbide composites (Si/SiC) and silicon carbide-silicon carbide composites (SiC/SiC), to mention a few. An example of a silicon-containing continuous fiber ceramic composite is a silicon-silicon carbide matrix composite with silicon carbide-containing fibers and any of the above mentioned ceramics or composites that contain fibers are CFCC. By "silicon carbide-containing fiber" is meant a fiber having a composition that contains silicon carbide, and in one example contains substantially silicon carbide. For instance, the fiber may have a silicon carbide core surrounded with carbon, or in the reverse, the fiber may have a carbon core surrounded by or encapsulated with silicon carbide. These examples are given for demonstration of the term "silicon carbide-containing fiber" and are not limited to this specific combination. Other fiber compositions are contemplated, so long as they contain carbon, silicon carbide, a silicon carbide-containing material, silicon nitride, a silicon-containing ceramic, or mixtures thereof.

For instance, other core materials which may be enveloped by silicon carbide include carbon and tungsten. The fibrous material can be amorphous, crystalline, or a mixture thereof. The crystalline material may be single crystal or polycrystalline. Examples of silicon carbide-containing fibrous materials are silicon carbide, Si—C—O, Si—C—O—N, Si—C—O-Metal, and Si—C—O-Metal where the Metal component can vary but frequently is titanium or zirconium or aluminum. There are processes known in the art which use organic precursors to produce silicon carbide-containing fibers which may introduce a wide variety of elements into the fibers.

Additionally, a continuous fiber reinforced silicon-containing ceramic composite may comprise a silicon-silicon carbide matrix composite or a silicon carbide matrix composite with carbon-containing or silicon-containing fibers or silicon and carbon containing fibers with or without coatings on said fibers. Acceptable coatings for such fibers would be, but not limited to, nitrides, borides, carbides, oxides, silicides, or other similar ceramic refractory material. Representative of ceramic carbide coatings are carbides of boron, chromium, hafnium, niobium, silicon, tantalum, titanium, vanadium, zirconium, and mixtures thereof. Representative of the ceramic nitrides useful in the present process is the nitride of boron, hafnium, niobium, silicon, tantalum, titanium, vanadium, zirconium, and mixtures thereof. Examples of ceramic borides are the borides of hafnium, niobium, tantalum, titanium, vanadium, zirconium, and mixtures thereof. Examples of oxide coatings are oxides of aluminum, yttrium, titanium, zirconium, beryllium, silicon, and the rare earths. The thickness of the coating can be about 0.1 to about 4.0 micrometers thick. One exemplary thickness is about 0.3-1.0 micrometers. Some other examples of coatings for fibers are selected from the group consisting of boron nitride, silicon doped boron nitride, silicon nitride, silicon carbide, carbon and mixtures thereof.

The fibrous material may have more than one coating. An additional coating should be wettable with silicon and be about 500 Angstroms to about 3 micrometers. Representative of useful silicon-wettable materials is elemental carbon, metal carbide, a metal coating which later reacts with molten silicon to form a silicide, a metal nitride such as silicon nitride, and a metal silicide. Elemental carbon is one example and is usually deposited on the underlying coating in the form of pyrolytic carbon. Generally, the metal carbide is a carbide of silicon, tantalum, titanium, or tungsten. The metal nitride may be a nitride of boron, hafnium, niobium, silicon, tantalum, titanium, vanadium, zirconium, and mixtures thereof. Generally, the metal silicide is a silicide of chromium, molybdenum, tantalum, titanium, tungsten, and zirconium. The metal which later reacts with molten silicon to form a silicide must have a melting point higher than the melting point of silicon and in one example higher than about 1450° C. Usually, the metal and silicide thereof are solid in the present process. Representative of such metals is chromium, molybdenum, tantalum, titanium, and tungsten.

The silicon-containing ceramics or composites are made by methods known in the art. For illustrative purposes, a silicon-silicon carbide composite can be made by melt infiltration techniques, as described in U.S. Pat. Nos. 5,015,540; 5,330,854; and 5,336,350, incorporated herein by reference. Also, the continuous fiber silicon-containing ceramic composites can be made by various methods known in the art, such as taught in U.S. Pat. No. 6,024,898, incorporated herein by reference. Silicon-containing composites can also be made by Chemical Vapor Infiltration (CVI) and Polymer Impregnation and Pyrolysis (PIP), or by a combination CVI or PIP and the melt infiltration process.

Reduction of Silica Recession Using Silicon-Doping of Compressed Air

According to one aspect, the present technique provides a method that involves silicon-doping of compressed air to reduce silica recession of a silicon-containing ceramic or silicon-containing ceramic composite exposed to a combustion gas environment. Generally, as illustrated in FIG. 1, this method 100 involves the following steps: (i) exposing a silicon-containing ceramic or silicon-containing ceramic composite to a high temperature combustion gas environment (step 110 of FIG. 1); and (ii) contacting a target surface of the silicon-containing ceramic or silicon-containing ceramic composite with a silicon-doped gas mixture, thereby reducing silica recession of the target surface (step 120 of FIG. 1).

According to this method, the silicon-doped gas mixture is produced by injecting silicon into compressed air at a location proximate the target surface to yield silicon-doped compressed air, and co-mingling the silicon-doped compressed air with the combustion gas to yield the silicon-doped gas mixture.

In one embodiment, the silicon-doped compressed air comprises at least one of elemental silicon, silicon-containing compound, or mixtures thereof. The silicon-containing compound can include, without limitation, siloxanes, silanes, silica, silicones, silicon carbides, silicon nitrides, silicon oxides, silicates, sand, and mixtures thereof. The siloxane can be, without limitation, octamethylcyclotetrasiloxane, hexamethyldisiloxane, or mixtures thereof.

Figure 3:
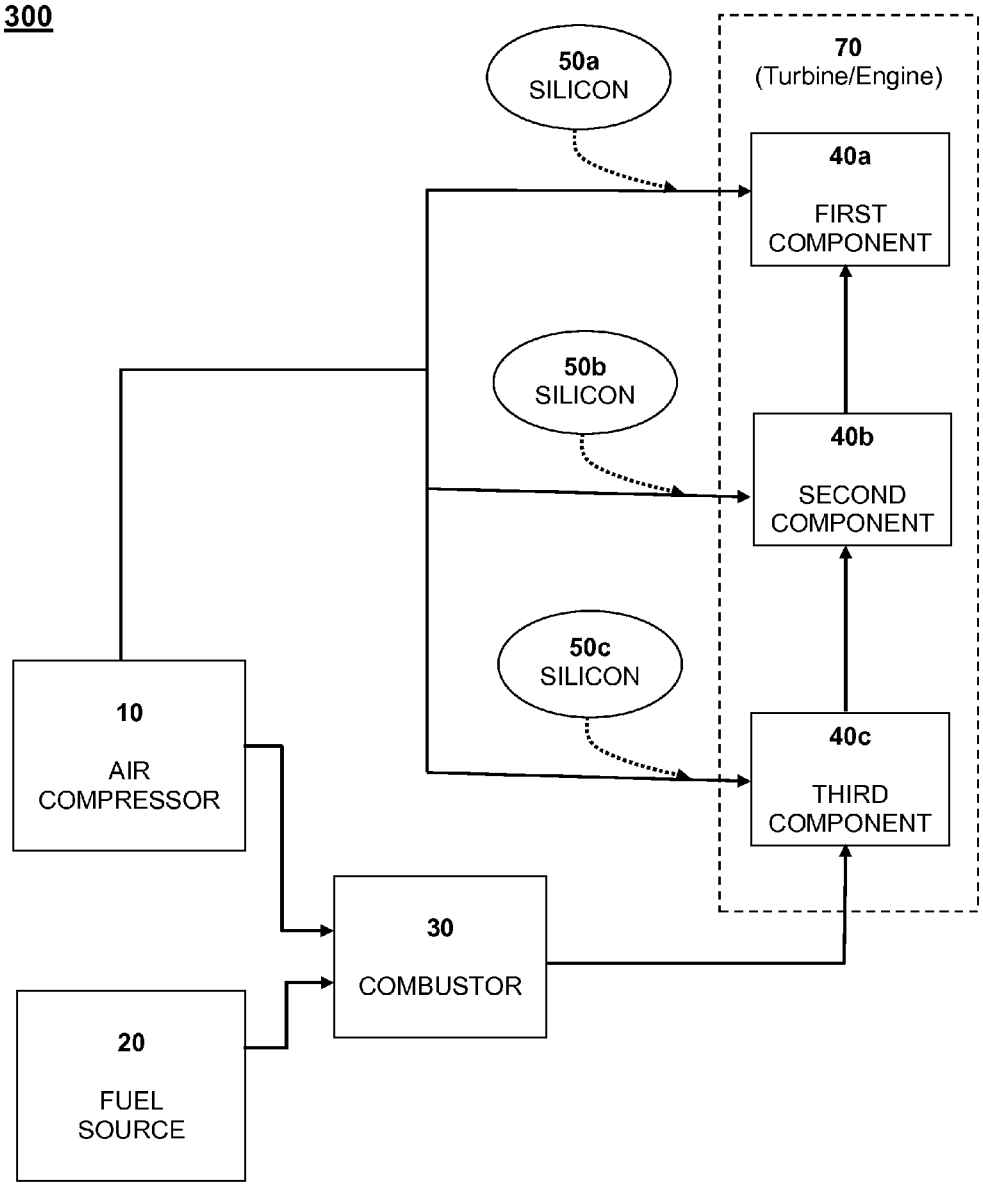
FIG. 3 is a schematic drawing of one embodiment of a system for reducing silica recession according to the present disclosure. The embodiment shown in FIG. 3 includes a combustor, an air compressor, and at least one silicon injector (50a, 50b, 50c) for injecting silicon into compressed air to yield silicon-doped compressed air.

In a particular embodiment, the silicon-doped compressed air is produced by injecting silicon into the compressed air immediately prior to co-mingling the combustion gas with the silicon-doped compressed air. As used herein, the process of injecting silicon into the compressed air immediately prior to co-mingling the combustion gas with the silicon-doped compressed air is referred to as locally injecting or localized injection of silicon. As provided herein, in order to locally inject silicon at the desired location (e.g., the target surface of a land-based turbine or of an aircraft engine), at least one silicon injector can be positioned proximate the desired location (see FIG. 3). As shown in FIG. 3, system 300 for reducing silica recession includes silicon injectors 50a, 50b, and 50c at locations proximate to first component 40a, second component 40b, and third component 40c, respectively. Silicon injectors 50a, 50b, and 50c are examples of proximately positioned silicon injectors in accordance with the present disclosure.

Figure 5:
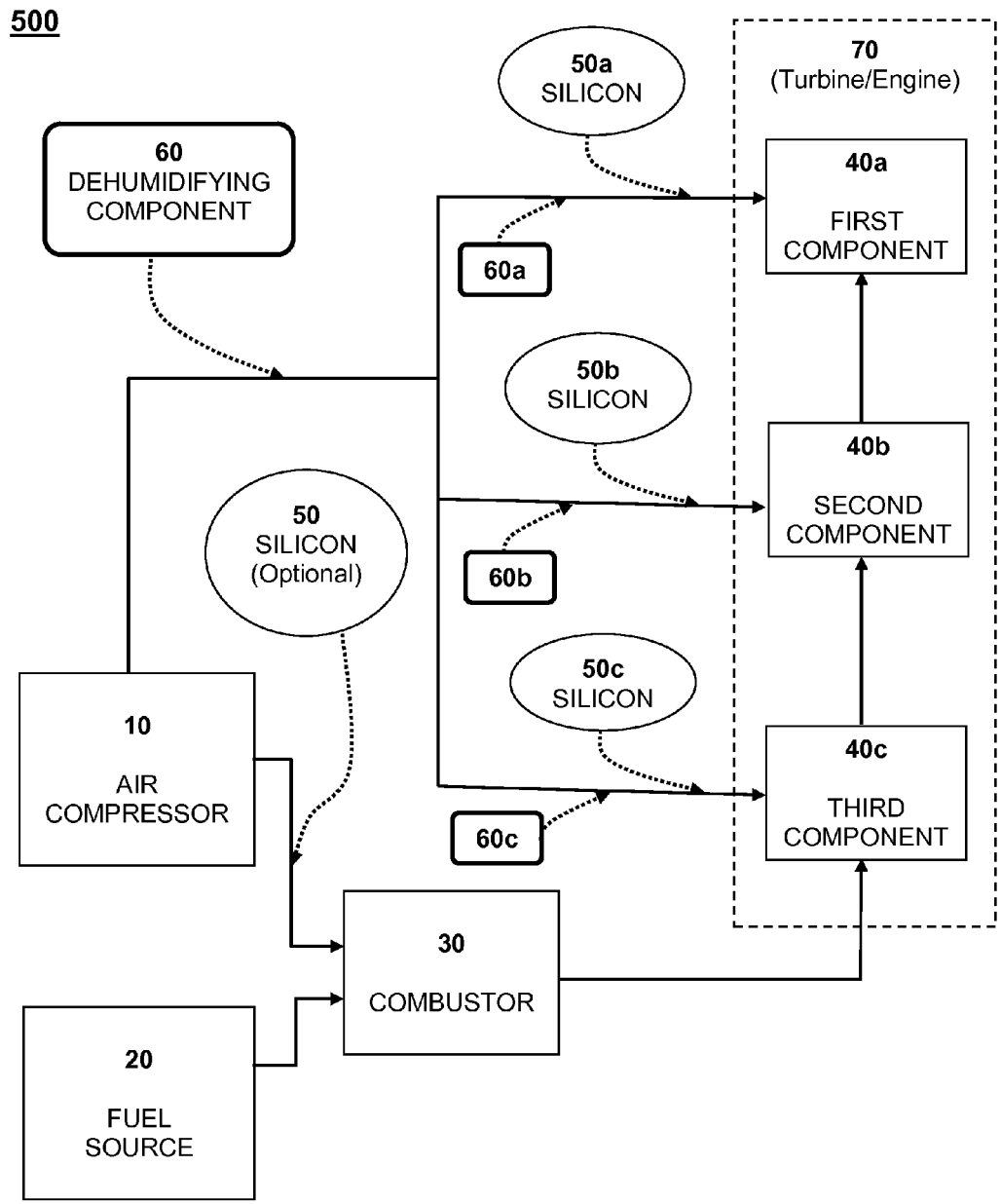
FIG. 5 is a schematic drawing of one embodiment of a system for reducing silica recession according to the present disclosure. The embodiment shown in FIG. 5 includes a combustor, an air compressor, at least one silicon injector (50a, 50b, 50c) for injecting silicon into compressed air to yield silicon-doped compressed air, and at least one dehumidifying component (60a, 60b, 60c) for providing a moisture removal agent to the compressed air prior to co-mingling the silicon-doped, dehumidified compressed air with a combustion gas.

By way of contrast, localized injection of silicon as provided in accordance with the present technique is distinguishable from silicon-doping of a combustion gas environment at a point more upstream of the target surface of the silicon-containing material (e.g., as described in U.S. Pat. No. 6,517, 341). As shown in FIG. 5, silicon injector 50 is an example of the placement of a silicon injector that it more upstream than the proximately positioned silicon injectors of the present disclosure.

The silicon can be in injected into the compressed air as solid matter, slurry, liquid, liquid solution, atomizing spray, gaseous substance, or mixture thereof.

As used herein, an "effective amount of silicon" means an amount of silicon in the compressed air that prevents or reduces the volatilization of the silica film located on the silicon-containing ceramic or on the silicon-containing ceramic composite, and which may further prevent the recession loss of the silicon-containing ceramic or ceramic composite. Further, an "effective amount of silicon" relates to an amount of silicon in the compressed air as measured on, at, or in close proximity to a surface of the silicon-containing ceramic or a surface of the silicon-containing ceramic composite to which the silicon is applied. A non-limiting example of an effective amount of silicon is a silicon level of about 0.02 to about 10.0 parts per million (ppm) by weight of the compressed air. Other non-limiting examples of effective amounts of silicon are silicon levels of between about 0.05 and about 5.0 ppm, between about 0.1 and about 2.0 ppm, between about 0.2 and about 1.0 ppm, and between about 0.3 and about 0.7 ppm by weight of the compressed air.

In another embodiment, the method involves injecting an effective amount of silicon into the combustion gas directly or indirectly to further prevent or reduce volatilization of the silica film, where indirectly injecting the silicon into the combustion gas includes injecting the silicon into fuel, combustion air, or mixtures thereof. An example of this aspect and other aspects of reducing material loss are found in commonly assigned U.S. Pat. No. 6,517,341.

The silicon or silicon-containing compounds can be added directly to the compressed air, and/or directly to the combustion fuel, to the combustion air, directly to the combustor, directly to the combustion gases, or to all of the above or to a combination of the above. The silicon or silicon-containing compounds can be in the solid, liquid, or gaseous state, provided that the compounds volatilize in the combustion gases. Thus, one aspect of the present system is the prevention or alleviation of material loss by preventing the reaction of the silicon-containing ceramic or ceramic composite components with the compressed air and/or the combustion gases.

In certain embodiments, it is desirable to add the silicon or silicon-containing compounds in a form that leads to rapid volatilization of silicon as silicon hydroxide. If rapid volatilization does not occur, then greater levels of silicon than those demonstrated below in Table 1 and Table 2 would be needed to prevent recession or thickness loss of the silica film and the underlying silicon-containing ceramic or composite. It is noted that Table 1 and Table 2 are taken from U.S. Pat. No. 6,517,341 and are included herein for convenience. The silicon compounds can be added to the liquid fuel as organic compounds in a solution or as a slurry that can be emulsified. Examples of organic compounds that can be used for addition to the compressed air or fuel are siloxanes, such as, but not limited to, octamethylcyclotetrasiloxane $\{Si_4O_4(CH_3)_8\}$ and hexamethyidisiloxane $\{Si_2O(CH_3)_6\}$. Both of these compounds are low viscosity liquids with good stability toward water vapor in air.

The silicon-containing compounds can also be added into the air used for combustion. They can be added downstream of the compressor and just before the combustor. They can also be added directly into the combustion gases, as well as into the air used for combustion which will allow rapid volatilization. The silicon-containing compounds can be in the form of organic compounds, which would volatilize readily, or in the form of slurries of fine particulate silicon-containing compounds, such as, but not limited to, silicon oxide, silicon, silicon carbide, silicon nitride, silicon boride, and mixtures thereof.

Additionally, the silicon-containing compound can be selected from the group consisting of siloxanes, silanes, silica, silicones, silicon carbides, silicon nitrides, silicon oxides, silicates, sand and mixtures thereof. Tetramethylsilane $\{Si(CH_3)_4\}$ with a boiling point of 26.5° C., can be added directly to the natural gas fuel. The siloxanes mentioned above, octamethylcyclotetrasiloxane $\{Si_4O_4(CH_3)_8\}$ and hexamethyldisiloxane $\{Si_2O(CH_3)_6\}$, have higher boiling points then tetrametylsilane, so they could be injected as liquids into the compressed air just ahead of pre-mixers. The technique would also include premixed prevaporized concepts, where prevaporization of the fuel and silicon-containing material then undergoes premixing of the vaporized fuel/silicon-containing material with the compressed air before combustion occurs. In addition, colloidal silica dispersed in water can be injected directly into the air stream before the combustor. The colloidal silica is present in the dispersion in an amount up to 60 weight percent, and in another example about 40 weight percent.

The silicon introduced into the combustion gases will be exhausted from the turbine or other combustion gas environment in the form of fine silica or other compounds which could form by reaction of the silica with other impurities present in the fuel or air. High purity liquid fuels typically contain a few parts per million of impurities. Many liquid fuels used in industrial gas turbines contain tens to several hundreds parts per million of impurities which ultimately go into the exhaust gases. By using the methods herein and injecting the combustion gases with silicon or silicon-containing compounds, the particulate level in the exhaust gases would increase for high purity fuels, such as used in aircraft engines, and would be negligible change for impure or dirty fuels used in turbines. Regardless, the overall silicon level of the combustion gases in the exhaust of the gas turbine would be much lower than in the compressed air where the silicon is injected or locally in the combustion gases. Consequently, the overall silicon level of the combustion gases going to the exhaust of the gas turbine would be lower than in the state of the art and would be lower than the limit allowed by EPA.

According to one embodiment the level of silicon needed by injection or mixing into the combustion gases is an amount to form a sufficient concentration of silicon hydroxide products, such as $Si(OH)_4$ so as to significantly reduce or eliminate the thermodynamic force for volatilization of the silica (silicon oxide) film, located on silicon-containing ceramic or ceramic composite components. The silicon levels needed to alleviate or prevent the thickness loss of the silica film and the component increase with the stoichiometric ratio, pressure, and temperature. The higher the water vapor level in the combustion gases, the higher the silicon level that is needed to be injected into the combustion gases.

For instance, by calculating the hydrogen/carbon ratio (H/C) in the fuel, one can calculate the water vapor level in the combustion gases and the amount of silicon needed to convert to silicon hydroxide or silicon oxyhydroxide products. The natural gas fuel with the H/C atomic ratio of about 4.0 would require a higher silicon injection level compared to liquid fuels with a H/C atomic ratios of about 1.7 to about 2.0. The fuel to air ratio of about one, which is a stoichiometric mixture, corresponds to the ratio that will burn with no excess air. A ratio below one indicates an excess of air while a ratio above one indicates insufficient air for combustion. The method outlined can be used for air to fuel ratios both below and above one. Table 1 demonstrates the results for a stoichiometric ratio up to 0.4 using silicon doping levels under varying turbine operating conditions. The silicon levels are given both for fuel and air. The required silicon levels in combustion gases will be essentially similar to those in air because the air/fuel weight ratios are very high. As illustrated in Table 1, the silicon levels needed for higher stoichiometric ratios would be higher. The silicon levels needed to prevent or minimize the recession loss are expected to be maximum for a stoichiometric ratio of about 1. At higher stoichiometric ratios, the water vapor content would again decrease which would require optimization of additions of silicon or silicon compounds to be defined by test conditions.

Provided below are Tables 1 and 2 of U.S. Pat. No. 6,517,341, which have been described herein above. Unlike the disclosure of U.S. Pat. No. 6,517,341, the present techniques relate to the local concentration of the silicon in combustion gases (i.e., the local gases that are obtained by mixing the combustion gases and the compressed air). As provided herein, in various embodiments of the present techniques, the mixing is such that the local concentration exceeds the limits set forth in Tables 1 and 2.

TABLE 1

Silicon doping levels needed to alleviate silica and silicon-containing ceramics or ceramic composite surface recession loss under different turbine operating conditions.

| Fuel Type | Stoichiometric Ratio (Phi) | Air/Fuel Ratio (By Weight) | Water Level in gasses (Vol %) | Pressure (atm) | Temp. (° C.) | Silicon Levels Required (ppm) In Fuel | In Air |
|---|---|---|---|---|---|---|---|
| Natural Gas | 0.250 | 68.7 | 5.1 | 15 | 1100 | 6.5 | .10 |
| | 0.250 | 68.7 | 5.1 | 15 | 1200 | 9.1 | 0.13 |
| | 0.250 | 68.7 | 5.1 | 15 | 1300 | 12.3 | 0.18 |
| | 0.250 | 68.7 | 5.1 | 15 | 1400 | 15.9 | 0.23 |
| | 0.325 | 52.8 | 6.6 | 15 | 1100 | 8.4 | 0.16 |
| | 0.325 | 52.8 | 6.6 | 15 | 1200 | 11.8 | 0.22 |
| | 0.325 | 52.8 | 6.6 | 15 | 1300 | 15.8 | 0.30 |
| | 0.325 | 52.8 | 6.6 | 15 | 1400 | 20.5 | 0.38 |
| | 0.400 | 42.9 | 8.1 | 15 | 1100 | 10.3 | 0.24 |
| | 0.400 | 42.9 | 8.1 | 15 | 1200 | 14.4 | 0.34 |
| | 0.400 | 42.9 | 8.1 | 15 | 1300 | 19.3 | 0.45 |
| | 0.400 | 42.9 | 8.1 | 15 | 1400 | 25.1 | 0.58 |
| | 0.250 | 68.7 | 5.1 | 1 | 1200 | 0.6 | 0.01 |
| | 0.250 | 68.7 | 5.1 | 10 | 1200 | 6.1 | 0.09 |
| | 0.250 | 68.7 | 5.1 | 20 | 1200 | 12.2 | 0.18 |
| | 0.250 | 68.7 | 5.1 | 30 | 1200 | 18.3 | 0.27 |
| Liquid Fuel | 0.250 | 57.1 | 3.1 | 15 | 1100 | 2.0 | 0.03 |
| | 0.250 | 57.1 | 3.1 | 15 | 1200 | 2.7 | 0.05 |
| | 0.250 | 57.1 | 3.1 | 15 | 1300 | 3.7 | 0.06 |
| | 0.250 | 57.1 | 3.1 | 15 | 1400 | 4.8 | 0.08 |
| | 0.325 | 44.0 | 4.0 | 15 | 1100 | 2.5 | 0.06 |
| | 0.325 | 44.0 | 4.0 | 15 | 1200 | 3.5 | 0.08 |
| | 0.325 | 44.0 | 4.0 | 15 | 1300 | 4.8 | 0.11 |
| | 0.325 | 44.0 | 4.0 | 15 | 1400 | 6.2 | 0.14 |
| | 0.400 | 35.7 | 4.9 | 15 | 1100 | 3.1 | 0.09 |
| | 0.400 | 35.7 | 4.9 | 15 | 1200 | 4.3 | 0.12 |
| | 0.400 | 35.7 | 4.9 | 15 | 1300 | 5.8 | 0.16 |
| | 0.400 | 35.7 | 4.9 | 15 | 1400 | 7.5 | 0.21 |

Benefits to protect the silica and silicon-containing ceramics and composites can also be obtained at lower silicon levels than those shown in Table 1. Some reduction will occur at silicon levels below those in Table 1. Table 2 show the effect of the silicon level on the reduction of the recession loss rate. Table 2 demonstrates that the recession loss problem can be fully prevented theoretically. However, in practice a 100% reduction of recession loss may not be achievable. Also, higher silicon levels, up to a factor of about 5 to about 10, than those shown in Tables 1 and 2 might be needed because of the slow rate of volatilization of silicon additives and because of different operating conditions of turbines than those shown in Tables 1 and 2.

TABLE 2

Effect of silicon level in combustion air on reduction in surface recession rate in silicon-containing ceramics*

| Silicon Level | 0.00 | 0.05 | 0.10 | 0.15 | 0.20 (ppm) in air |
|---|---|---|---|---|---|
| % Reduction | 0.0 | 22 | 45 | 67 | 90 |

*Pressure = 15 atm, Phi = 0.325 (stoichiometric ratio of fuel to air), Temperature = 1200° C.

In one embodiment, this method further involves creating a laminar flow of the silicon-doped gas mixture over the target surface of the silicon-containing ceramic or silicon-containing ceramic composite. A laminar flow as known in the art has reduced mixing and turbulence such that it has an extended flow path. Thus, for example, laminar flow of the silicon-doped gas mixture is useful to reduce the mixing of the silicon-doped gas mixture with combustion gas. Methods, techniques, systems, and arrangements of how to create laminar flow as described and contemplated herein are well known in the art.

In another embodiment, the method further involves removing at least some moisture from the compressed air. In a particular embodiment, the moisture is removed from the compressed air prior to co-mingling it with the combustion gas, where removal of moisture from the compressed air is effective to prevent or reduce volatilization of a silica film located on the silicon-containing ceramic or the silicon-containing ceramic composite.

According to another aspect, the present technique provides a system for using localized silicon-doping to reduce silica recession of a silicon-containing ceramic or silicon-containing ceramic composite exposed to a combustion gas environment. Generally, this system includes: (i) a combustor providing a high temperature combustion gas to at least one silicon-containing ceramic or silicon-containing ceramic composite; (ii) an air compressor providing compressed air for co-mingling with the combustion gas; and (iii) at least one silicon injector for injecting silicon into the compressed air to yield silicon-doped compressed air, where the at least one silicon injector is positioned so that injection of the silicon is performed immediately prior to co-mingling the combustion gas with the compressed air.

In one embodiment of this system, the silicon-containing ceramic or silicon-containing ceramic composite are turbine components that include, without limitation, combustion liners, vanes and blades, nozzles, buckets, transition pieces, shrouds, and retrofit ceramic vanes. In another embodiment, the system is integrated as part of a land based gas turbine apparatus, an aircraft engine, or heat exchanger.

In one embodiment, this system further includes at least one dehumidifying component for providing a moisture removal agent to the compressed air prior to co-mingling the dehumidified, silicon-doped compressed air with the combustion gas.

FIG. 3 illustrates one embodiment of the system for using localized silicon-doping to reduce silica recession of a silicon-containing ceramic or silicon-containing ceramic composite exposed to a combustion gas environment. As shown in FIG. 3, system 300 includes air compressor 10, fuel source 20, combustor 30, first component 40$a$, second component 40$b$, third component 40$c$, and silicon injectors 50$a$, 50$b$, and 50$c$. Components 40$a$, 40$b$, and 40$c$ correspond to the silicon-containing ceramics or silicon-containing ceramic composites that are exposed to a combustion gas environment 70 (e.g., a land-based gas turbine or an aircraft engine). While FIG. 3 illustrates three components (40$a$, 40$b$, and 40$c$), the present system can include more or less than three components. As shown in FIG. 3, air compressor 10 provides compressed air to combustor 30 using one pathway and provides compressed air to components 40$a$, 40$b$, and 40$c$ using a separate pathway. Fuel source 20 feeds fuel to combustor 30. The compressed air from air compressor 10 and the fuel from fuel source 20 are combined in combustor 30 in accordance with usual combustion devices. Combustion gas from combustor 30 then flows to components 40$a$, 40$b$, and 40$c$, thereby exposing these components to a combustion gas environment 70. Silicon injectors 50$a$, 50$b$, and 50$c$ are positioned proximate to components 40$a$, 40$b$, and 40$c$, respectively. Silicon injectors 50$a$, 50$b$, and 50$c$ inject silicon into the compressed air provided by air compressor 10 to yield silicon-doped compressed air prior to co-mingling with the combustion gas provided by combustor 30. In an optional embodiment, the system may further comprise a silicon injector to inject silicon into the compressed air provided by air compressor 10 at a location not proximate to components 40$a$, 40$b$, or 40$c$.

Reduction of Silica Recession Using Dehumidification of Compressed Air

According to another aspect, the present technique provides a method that involves removal of moisture from compressed air prior to co-mingling of the compressed air to combustion gas in order to reduce silica recession of a silicon-containing ceramic or silicon-containing ceramic composite exposed to a combustion gas environment. Generally, as illustrated in FIG. 2, this method 200 involves the following steps: (i) exposing a silicon-containing ceramic or silicon-containing ceramic composite to a high temperature combustion gas environment (step 210 of FIG. 2); and (ii) contacting a target surface of the silicon-containing ceramic or silicon-containing ceramic composite with a dehumidified gas mixture, thereby reducing silica recession of the target surface (step 220 of FIG. 2). In certain embodiments, the method is useful for reducing recession in portions of ceramic components that are not directly exposed to combustion gases. For example, in some cases, the inside of a particular ceramic component may not be directly exposed to combustion gases, but would still have the recession problem because of the presence of water vapor in compressed air. Thus, in such cases, the present technique can assist in reducing or removing moisture from the compressed air that may come into contact with the inside of the ceramic component.

According to this method, in various embodiments, the dehumidified gas mixture includes compressed air treated with a moisture removal agent effective to remove moisture from the compressed air. In a particular embodiment, the dehumidified gas mixture includes combustion gas co-mingled with the compressed air treated with the moisture removal agent effective to remove moisture from the compressed air. In such an embodiment, co-mingling of the compressed air and the combustion gas generally occurs on the outside surface of the component exposed to combustion gases, rather than on the internal surfaces of the component.

As used herein, the term "moisture removal agent" includes any inorganic material, organic material, system, mechanism, mechanical device, and the like that is effective to remove moisture from the compressed air. For example, as used herein, a "moisture removal agent" can include, without limitation, a moisture absorbing agent, cooled air, or any other agent or means useful for removing moisture from compressed air. Suitable moisture removal agents for use in this method are known in the art. Non-limiting examples of suitable inorganic materials for use as moisture removal agents include, without limitation, silica gels, anhydrous calcium sulfate (e.g., DRIERITE® materials), and the like.

In one embodiment, the dehumidified gas mixture is produced by passing compressed air through a moisture removal agent in order to reduce moisture content of the compressed air in an amount sufficient to reduce moisture content prior to co-mingling with the combustion gas when mixed therewith. In a further embodiment, the pretreated compressed air is provided by cooling compressed air to a temperature sufficient to remove moisture from the combustion gas when mixed therewith. In some embodiments, the compressed air can be cooled by a cooling system that includes, without limitation, a condenser and/or refrigeration system, or the like.

In general, as is understood in the art, the water vapor level of the compressed air depends upon the temperature and humidity and can vary quite widely. For example, at an outside air temperature of −10° C., the moisture content may be less than 0.3%, while at a temperature of 40° C. the water vapor content of the outside air may be as high as ~7.3%. As is understood in the art, the water vapor level to be removed depends upon the operating conditions of the turbine. For lower temperature and lower pressure operation, higher water vapor levels can be tolerated than for higher temperatures and higher pressures. It would be desirable to reduce the water vapor level to below 1%, preferably below 0.5%, and in some cases below ~0.1-0.2%.

The pretreated compressed air can include compressed air that is used for cooling the silicon-containing ceramics or silicon-containing ceramic composites in situ or for cooling components associated with the silicon-containing ceramics or silicon-containing ceramic composites in situ. As used herein, the term "in situ" refers to using the silicon-containing ceramics, the silicon-containing ceramic composites, or the components associated with the silicon-containing ceramics or ceramic composites in their intended application, including, without limitation, in high temperature structural applications such as component parts for gas turbines, aircraft engines, and heat exchangers. In one example the dehumidified gas mixture is used in the internal passages of the component such that the coating on the interior can be eliminated. For land-based systems, removing moisture in the cooling air reduces the recession from inside the component and increases the product life.

In another embodiment, the pretreated compressed air is injected so that it provides a flow condition effective to reduce mixing of the combustion gas with the compressed air or to reduce water vapor content on the surface of the silicon-containing ceramics or silicon-containing ceramic composites. For example, the pretreated compressed air can be injected in a manner to create a laminar flow of the compressed air over the surface of the silicon-containing ceramic or silicon-containing ceramic composite, thereby minimizing mixing of the compressed air with the combustion gas and minimizing the water vapor content on the surface of the silicon-containing ceramic or silicon-containing ceramic composite.

Thus, in a particular embodiment, this method further involves creating a laminar flow of the dehumidified gas mixture over the target surface of the silicon-containing ceramic or silicon-containing ceramic composite. In another embodiment, this method further involves injecting silicon into the compressed air at a location proximate the target surface, where the silicon is injected into the compressed air before, after, or both before and after dehumidifying the compressed air. Processes and materials for injection of silicon are as provided elsewhere herein.

According to another aspect, the present technique provides a system that incorporates removal of moisture from compressed air prior to co-mingling of the compressed air to combustion gas in order to reduce silica recession of a silicon-containing ceramic or silicon-containing ceramic composite exposed to a combustion gas environment. Generally, this system includes: (i) a combustor providing a high temperature combustion gas to a at least one silicon-containing ceramic or silicon-containing ceramic composite; (ii) an air compressor providing compressed air for co-mingling with the combustion gas; and (iii) a dehumidifying component providing a moisture removal agent to the compressed air prior to co-mingling the dehumidified compressed air with the combustion gas.

Suitable combustors and air compressors for use in this system are commonly known in the relevant art. As used herein, a "dehumidifying component" refers to any device, system, apparatus, compound, composition, material, and the like that is effective to provide a moisture removal agent to the compressed air before the compressed air co-mingles with the combustion gas in the combustion gas environment. Thus, a suitable dehumidifying component of this system is effective to provide such moisture removal agents as described herein, including any inorganic material, organic material, system, mechanism, mechanical device, or the like that is effective to remove moisture from the compressed air.

In one embodiment of this system, the silicon-containing ceramic or silicon-containing ceramic composite are turbine components that include, without limitation, combustion liners, vanes and blades, nozzles, buckets, transition pieces, shrouds, and retrofit ceramic vanes. In another embodiment, the system is integrated as part of a land based gas turbine apparatus, an aircraft engine, or heat exchanger.

In one embodiment, this system further includes at least one silicon injector for injecting silicon into the compressed air to yield silicon-doped compressed air, where the at least one silicon injector is positioned so that injection of the silicon is performed immediately prior to co-mingling the combustion gas with the dehumidified compressed air.

Figure 4:
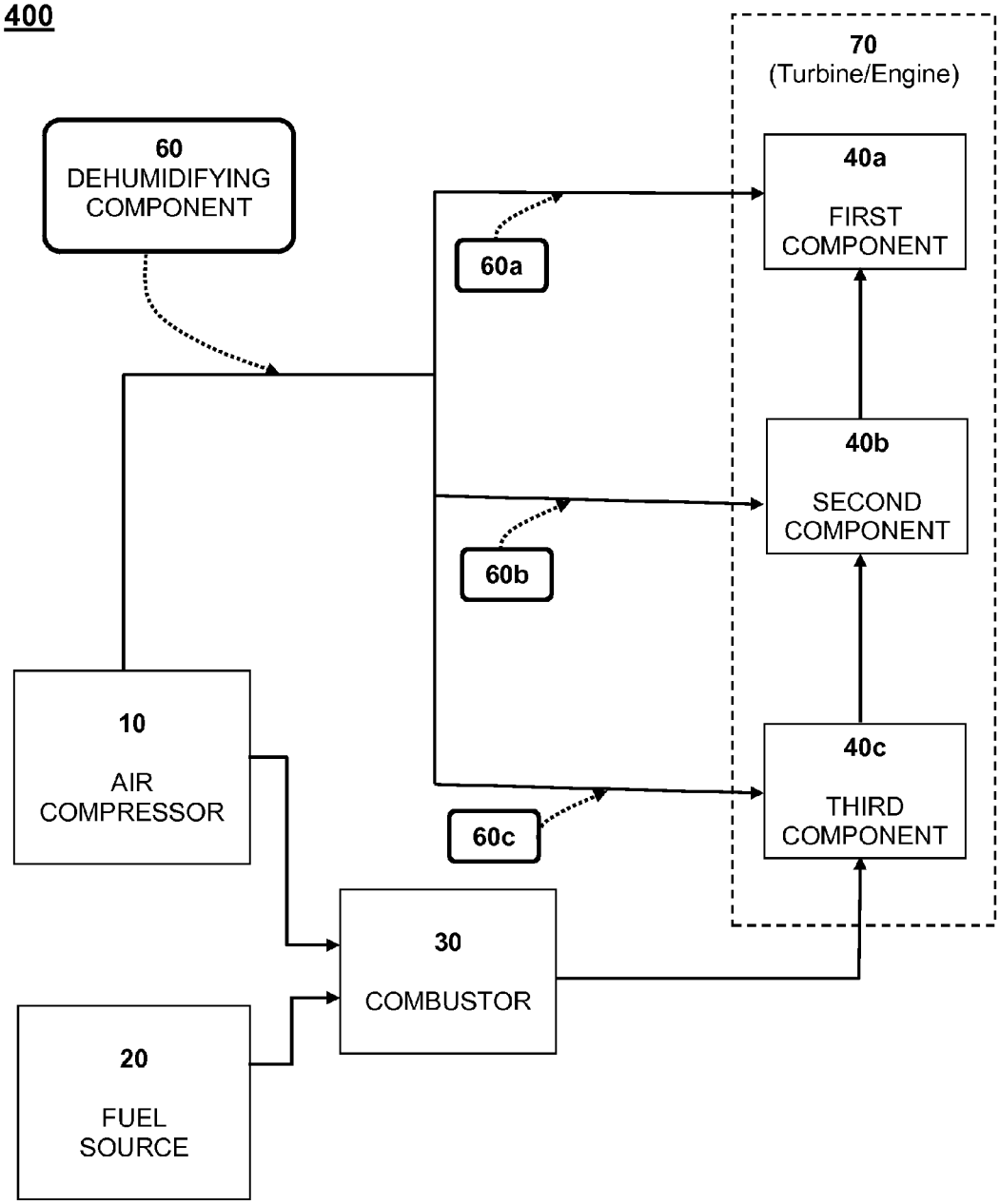
FIG. 4 is a schematic drawing of one embodiment of a system for reducing silica recession according to the present disclosure. The embodiment shown in FIG. 4 includes a combustor, an air compressor, and at least one dehumidifying component (60a, 60b, 60c) for providing a moisture removal agent to the compressed air prior to co-mingling the dehumidified compressed air with the combustion gas.

FIG. 4 illustrates one embodiment of the system that incorporates removal of moisture from compressed air prior to co-mingling of the compressed air to combustion gas in order to reduce silica recession of a silicon-containing ceramic or silicon-containing ceramic composite exposed to a combustion gas environment. As shown in FIG. 4, system 400 includes air compressor 10, fuel source 20, combustor 30, first component 40a, second component 40b, third component 40c, dehumidifying component 60, dehumidifying component 60a, dehumidifying component 60b, and dehumidifying component 60c. Components 40a, 40b, and 40c correspond to the silicon-containing ceramics or silicon-containing ceramic composites that are exposed to a combustion gas environment 70 (e.g., a land-based gas turbine or an aircraft engine). While FIG. 4 illustrates three components (40a, 40b, and 40c), the present system can include more or less than three components. As shown in FIG. 4, air compressor 10 provides compressed air to combustor 30 using one pathway and provides compressed air to components 40a, 40b, and 40c using a separate pathway. Fuel source 20 feeds fuel to combustor 30. The compressed air from air compressor 10 and the fuel from fuel source 20 are combined in combustor 30 in accordance with usual combustion devices. Combustion gas from combustor 30 flows to components 40a, 40b, and 40c, thereby exposing these components to a combustion gas environment 70. Dehumidifying component 60 provides a moisture removal agent to the compressed air provided by air compressor 10 at a location upstream from components 40a, 40b, and 40c. Dehumidifying components 60a, 60b, and 60c are positioned proximate to components 40a, 40b, and 40c, respectively. Thus, dehumidifying components 60a, 60b, and 60c provide moisture removal agents to the compressed air provided by air compressor 10 to yield dehumidified compressed air prior to co-mingling of the dehumidified compressed air with the combustion gas provided by combustor 30.

In an optional embodiment, as shown in FIG. 3, silicon injectors can be used to inject silicon into the compressed air provided by air compressor 10 at a location proximate to components 40a, 40b, or 40c, as well as into the compressed air to combustor 30.

Combined Silicon-Doping and Dehumidification of Compressed Air

Another aspect of the present disclosure provides a method and system for combining both silicon-doping and dehumidification of compressed air in order to reduce silica recession in silicon-containing ceramics or silicon-containing ceramic composites exposed to a combustion gas environment. According to this aspect, the method and system use at least one silicon injector for injecting silicon into compressed air to yield silicon-doped compressed air, and at least one dehumidifying component for providing a moisture removal agent to the compressed air prior to co-mingling the silicon-doped, dehumidified compressed air with a combustion gas.

The combination of silicon-doping and dehumidification of compressed air in accordance with the present disclosure is illustrated schematically in FIG. 5. Referring to FIG. 5, in one embodiment, system 500 includes air compressor 10, fuel source 20, combustor 30, first component 40a, second component 40b, third component 40c, silicon injector 50 (optional), silicon injector 50a, silicon injector 50b, silicon injector 50, dehumidifying component 60, dehumidifying component 60a, dehumidifying component 60b, and dehumidifying component 60c. Components 40a, 40b, and 40c correspond to the silicon-containing ceramics or silicon-containing ceramic composites that are exposed to a combustion gas environment 70 (e.g., a land-based gas turbine or an aircraft engine). While FIG. 5 illustrates three components (40a, 40b, and 40c), the present system can include more or less than three components. As shown in FIG. 5, air compressor 10 provides compressed air to combustor 30 using one pathway and provides compressed air to components 40a, 40b, and 40c using a separate pathway. Fuel source 20 feeds fuel to combustor 30. The compressed air from air compressor 10 and the fuel from fuel source 20 are combined in combustor 30 in accordance with usual combustion devices. Combustion gas from combustor 30 then flows to components 40a, 40b, and 40c, thereby exposing these components to a combustion gas environment 70.

Dehumidifying component 60 provides a moisture removal agent to the compressed air provided by air compressor 10 at a location upstream from components 40a, 40b, and 40c. Dehumidifying components 60a, 60b, and 60c are positioned proximate to components 40a, 40b, and 40c, respectively. Thus, dehumidifying components 60a, 60b, and 60c provide moisture removal agents to the compressed air provided by air compressor 10 to yield dehumidified compressed air prior to co-mingling of the dehumidified compressed air with the combustion gas provided by combustor 30. Silicon injectors 50a, 50b, and 50c are also positioned proximate to components 40a, 40b, and 40c, respectively. Silicon injectors 50a, 50b, and 50c inject silicon into the dehumidified, compressed air provided by treating the compressed air with the moisture removal agents to yield silicon-doped compressed air prior to co-mingling with the combustion gas provided by combustor 30. In an optional embodiment, as shown in FIG. 5, silicon injector 50 (optional) can be used to inject silicon into the compressed air provided by air compressor 10 at a location not proximate to components 40a, 40b, or 40c and at a location prior to the compressed air entering combustor 30.

EXAMPLES

The following examples are intended to illustrate particular embodiments, but are by no means intended to limit the scope of the present systems and techniques.

Example 1

One embodiment can be demonstrated in a combustor rig. The rig can consist of a combustor that is used to generate combustion gases at a pressure of 10-15 atm using natural gas as fuel with an air/fuel ratio that provides the desired gas temperature of ~2400 F and a water vapor concentration of at least ~10%. The absolute temperature is not as critical as long as experiments are performed in a repeatable fashion with the same conditions. The combustion gases are then directed on a stationary vane. The dimensions of the vane are not important but the gas velocity on the surface of the vane is a factor. The vane height and span could be of the order of 2-3". The inlet gas velocity to the vane section should be of the order of 150-200 msec, which then accelerates to about 600 msec at the vane exit. The vane is made of Melt Infiltrated SiC/SiC composites but could also be made of sintered silicon nitride.

Experiment 1:

Experiments can first be conducted without any cooling holes in the vane (referred to herein as "Experiment 1"). The temperature of the vane can be monitored by thermocouples embedded on various locations of the vane with the surface temperature ranging from 2100 F to 2300 F. Even higher temperatures can be used in certain embodiments because they would increase the recession rate and the experiments can be conducted for a shorter duration. Combustion gases can be passed over the vane for times of the order of a few hundred hours. The expected recession rate of the ceramic component at the leading edge is expected to be of the order of 30 mils per 1000 hrs at the leading edge and of the order of 10 mils per 1000 hrs at the trailing edge. Therefore, experiments should be conducted for long enough time that recession rate can be measured. The required times are of the order of a few hundred hours.

Experiment 2:

Experiments can then be conducted with the vane with cooling holes thru which compressed air is passed to create a laminar flow on the surface of the vane (as in Experiment 1). It is very common for gas turbine components to have cooling air that is used to lower the temperature of the component. The amount of cooling air should be of the order of a few percent of the air used for the combustion in the combustor. The air should be saturated with water vapor level of ~3%, typical of hot and humid days in many parts of the world including parts of the United States, and should be at a temperature of ~2200 F. In gas turbines the cooling air is at a substantially lower temperature but a higher temperature is recommended to show that the benefits of cooling air are not due to lowering of the temperature of the CMC but because of the air used to reduce the moisture content of the combustion gases. The combustor conditions are to be maintained to be same as the ones for the first experiment. The temperature of the vane is to be carefully monitored. It is expected to be lower than in Experiment 1.

Again, the recession rate can be measured on the vane by conducting experiments at least for a few hundred hours to get measurable recession rate. On the surface of the vane the cooling air would mix with the combustion gases, and the effective moisture content of the combustion gases would be somewhere between that in the combustion gases (~10%) and that between the compressed air (~3%). Assuming a mixing efficiency of 50%, the water vapor content would be around 6.5%, and the recession rate is expected to go down by a factor of ~2.3 on the surface of the component. The mixing efficiency influences the moisture content of the combustion gases on the surface of the vane and the recession rate. For example, lower mixing efficiency would mix less combustion gases with the cooling air, and consequently the moisture content of the combustion gases would be lower than the 6.5% calculated above, and the reduction in recession rate would be higher than the factor of ~2.3 calculated here.

Example 2

Experiments can be conducted the same as in Experiment 2 above, except that no moisture is to be added to the compressed air, and any moisture present in the combustion gases is to be removed by passing over a drying agent or by cooling the air to temperatures below the freezing temperature of water. The moisture content of the compressed air is now expected to be close to zero, and assuming again a mixing efficiency of 50%, the effective moisture content of combustion gases would be ~5%, and the recession rate is expected to go down by a factor of 4 compared to Experiment 1 above in Example 1.

Example 3

Experiments can be conducted again as in Experiment 2 above in Example 1 above or like in the experiment in Example 2 above with one difference. A small concentration of volatile silicon organic compounds is to be added to the compressed air. The optimum silicon level can be experimentally determined and is of the order of 0.1 to 1.0 ppm. See Table 1. The silicon level would be higher than in Table 1 because of mixing of the compressed air with combustion gases. The silicon content is expected to be high enough to alleviate or even prevent the recession of the silicon carbide composite. Again, experiments need to be conducted for times of the order of a few hundred hours to measure the recession rate.

Although various embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A method of reducing silica recession, comprising:
   compressing air with an air compressor;
   exposing a silicon-containing ceramic or silicon-containing ceramic composite to a high temperature combustion gas environment provided by a combustor, wherein the combustor receives a first portion of compressed air from the compressor through a first pathway; and
   contacting a target surface of the silicon-containing ceramic or silicon-containing ceramic composite with a dehumidified gas mixture, thereby reducing silica recession of the target surface,
   wherein the dehumidified gas mixture comprises a second portion of compressed air from the compressor through a second pathway treated with a moisture removal agent effective to remove moisture from the second portion of compressed air, the method further comprising
   injecting silicon into the second portion of compressed air at a location proximate the target surface,
   wherein the silicon is injected into the second portion of compressed air before, after, or both before and after dehumidifying the second portion of compressed air.

2. The method according to claim 1, wherein the dehumidified gas mixture comprises combustion gas co-mingled with the second portion of compressed air treated with the moisture removal agent.

3. The method according to claim 1, wherein said moisture removal agent comprises any inorganic material, organic material, or mechanical device effective to remove moisture from the second portion of compressed air.

4. The method according to claim 3, wherein the inorganic material is selected from the group consisting of a silica gel, and anhydrous calcium sulfate.

5. The method according to claim 1, wherein the silicon-containing ceramic is selected from the group consisting of silicon carbide, silicon carbide-silicon carbide composite, silicon nitride, silicon-silicon carbide, molybdenum silicide, and mixtures thereof.

6. The method according to claim 5, wherein the silicon-containing ceramic is silicon carbide-silicon carbide composite.

7. The method according to claim 1, wherein the silicon-containing ceramic comprises silicon as a predominant component.

8. The method according to claim 1, wherein the silicon-containing ceramic composite is a continuous fiber reinforced ceramic composite.

9. The method according to claim 8, wherein the fiber is selected from the group consisting of carbon, silicon carbide, silicon carbide-containing material, and mixtures thereof.

10. The method according to claim 1, wherein the silicon-containing ceramic or silicon-containing ceramic composite is a high temperature turbine component.

11. The method according, to claim 1, wherein silica recession of the silicon-containing ceramic or silicon-containing ceramic composite is reduced by a recession rate factor of at least 2 and up to 100 compared to a silicon-containing ceramic or silicon-containing ceramic composite exposed to combustion gas without the dehumidified gas mixture.

12. The method according to claim 1 further comprising:
    creating a laminar flow of the dehumidified gas mixture over the target surface of the silicon-containing ceramic or silicon-containing ceramic composite.

13. A system for reducing silica recession, said system comprising:
    a combustor providing a high temperature combustion gas to a at least one silicon-containing ceramic or silicon-containing ceramic composite;
    an air compressor providing a first portion of compressed air to the combustor through a first pathway to produce the combustion gas and a second portion of compressed air through a second pathway for co-mingling with the combustion gas;
    at least one dehumidifying component providing a moisture removal agent to the second portion of compressed air prior to co-mingling dehumidified compressed air with the combustion gas; and
    at least one silicon injector for injecting silicon into the second portion of compressed air proximate to the at least one silicon-containing ceramic or silicon-containing ceramic composite.

14. The system according to claim 13, wherein said moisture removal agent comprises any inorganic material, organic material, or mechanical device effective to remove moisture from the second portion of compressed air.

15. The system according to claim 14, wherein the inorganic material is selected from the group consisting of a silica gel, and anhydrous calcium sulfate.

16. The system according to claim 13, wherein the silicon-containing ceramic or silicon-containing ceramic composite are turbine components selected from the group consisting of combustion liners, vanes and blades, nozzles, buckets, transition pieces, and shrouds.

17. The system according to claim 13, wherein the system is integrated as part of a land based gas turbine apparatus, aircraft engine, or heat exchanger.

18. The system according to claim 13, wherein the at least one silicon injector is positioned so that injection of the silicon is performed immediately prior to co-mingling the combustion gas with the second portion of compressed air.

* * * * *